E. W. DEMING.
METHOD OF TREATING CANE JUICE.
APPLICATION FILED JUNE 3, 1909.
997,605.
Patented July 11, 1911.
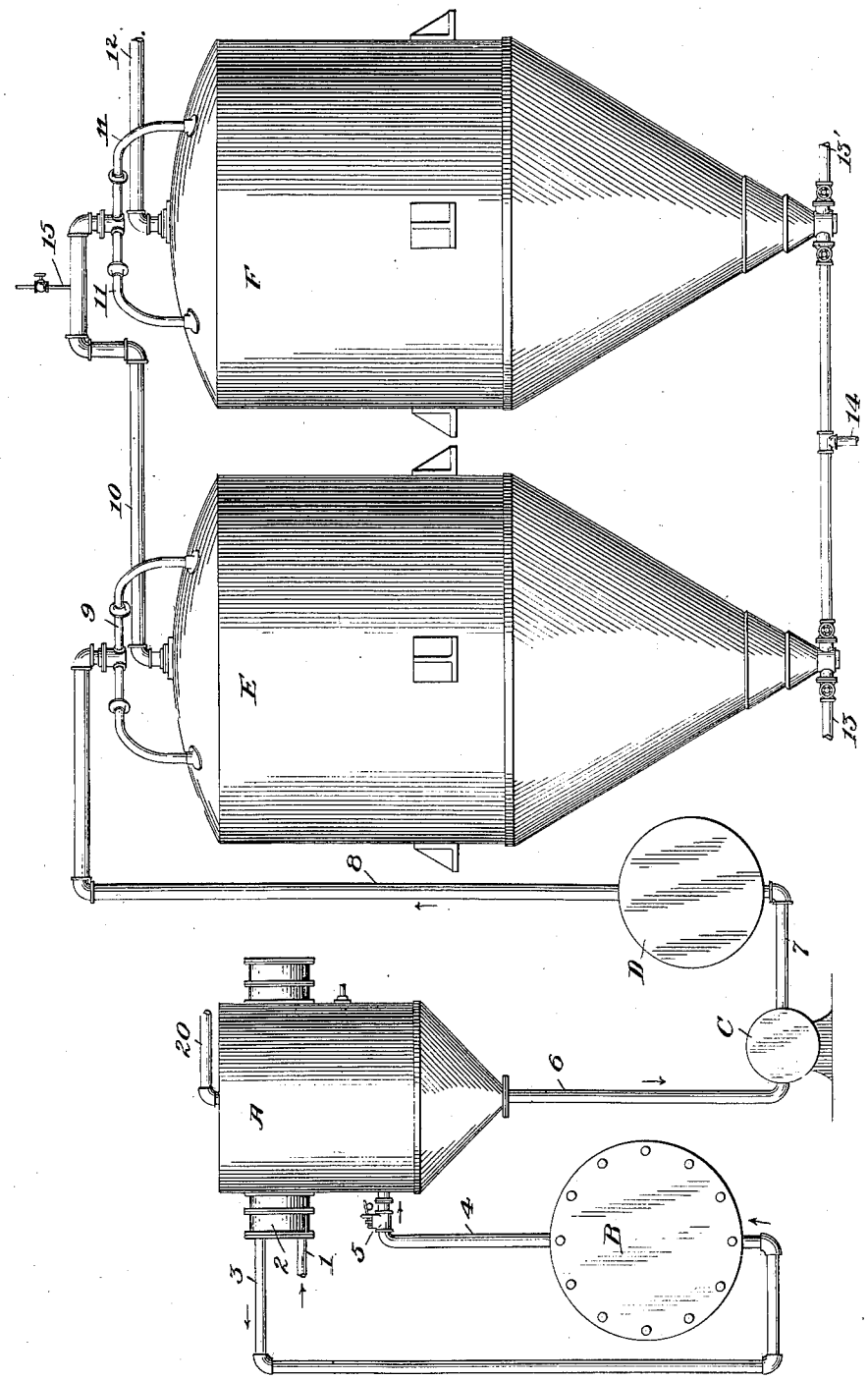
Witnesses:
Inventor:
Eugene W. Deming
by Byrnes, Townsend & Breckenstein,
Att'ys.

UNITED STATES PATENT OFFICE.

EUGENE W. DEMING, OF NEW YORK, N. Y., ASSIGNOR TO DEMING APPARATUS COMPANY, OF NEW YORK, N. Y., A CORPORATION OF NEW YORK.

METHOD OF TREATING CANE-JUICE.

997,605.

Specification of Letters Patent.

Patented July 11, 1911.

Application filed June 3, 1909. Serial No. 499,975.

*To all whom it may concern:*

Be it known that I, EUGENE W. DEMING, a citizen of the United States, residing at New York, in the county of New York and State of New York, have invented certain new and useful Improvements in Methods of Treating Cane-Juice, of which the following is a specification.

The object of this invention is the provision of a method whereby cane juices may be defecated and decolorized in a continuous manner and more efficiently and economically than by methods heretofore practiced.

In the direct manufacture of marketable grades of sugar from cane juices it is recognized that the coloring matters or colored extractives in the raw juice are derived from several sources and differ essentially in their chemical character and behavior with chemical reagents. These colored extractives proceed largely from the rind of the cane and appear in the expressed juices to an extent dependent upon the efficiency of the extraction and upon the character or variety of cane. Such juices are commonly clarified by the successive use of lime and sulfur dioxid, the effect of the lime being to produce a bulky precipitate of calcium salts of various organic acids, and that of sulfur dioxid being to bleach the juices. The action of sulfur dioxid on the coloring matters derived from the rind is however comparatively slight and is essentially temporary in character, the color re-appearing in the subsequent treatment of the juices and syrups. As a result, the syrups and masse-cuites are yellow or brown and ordinarily yield a grade of sugar known to the trade as "yellow clarified."

A modified defecation process heretofore practiced consists in adding to the juices, after the usual liming, a small proportion of a comparatively weak mineral acid, phosphoric acid being usually employed. This is added in presence of the lime or calcium precipitate, and in large part enters immediately into combination forming an insoluble calcium phosphate which is removed with the scums: its use in this manner has not been found appreciably more effective than that of sulfur dioxid. If however an acid of this character be added to the cleared or clarified juices from which the calcium precipitate has been removed, its effectiveness in destroying the coloring matters is greatly enhanced. According to the present invention such acid is employed under conditions affording the highest efficiency, not only in the decolorizing of the juice, but in the removal of suspended impurities which even in minute proportions have a most injurious effect upon the grade or quality of the sugar. Juices defecated and decolorized as hereinafter described are found in practice to be capable of yielding a high grade of marketable sugars even from highly colored raw juices, the treatment being continuous in character and not involving the necessity of filtering the entire body of juice.

I prefer to proceed substantially as follows: The raw juice from the mills is strained as usual and limed, the proportion of lime being usually sufficient completely to neutralize the acids of the juice, and preferably in very slight excess of this proportion. Sulfur dioxid may be applied to the cold juice, but its use is not necessary to the process. The juice is next heated under pressure in a continuous-flow heater which may be of the character described in my prior patents, being usually raised to a temperature somewhat exceeding the atmospheric boiling point, and is then preferably treated to effect the removal of the dissolved gases, which would otherwise slowly separate from the liquid and attach themselves to and buoy up a considerable proportion of the precipitate. This elimination of the gases is best effected by subjecting the juices proceeding from the heater in a suitable closed vessel to reduce pressure, as described in my copending application, Ser. No. 426,900, filed April 13, 1908. The gas-free juice passes thence to a closed continuous-flow separating or settling tank, which may be of the character described in my prior Patent No. 885,450, dated April 21, 1908. In this tank the bulk of the impurities, usually 90% or more of the total quantity, is separated by sedimentation. The comparatively clear, hot and gas-free juices issuing from this separating tank pass to a second tank of similar character to complete the sedimentation, or are filtered. A suitable acid, preferably dilute phosphoric acid, is introduced into the juice flowing from the first to the second of these tanks, the acid being added in solution, in a continuous stream, and in proportion to the flow of the juice. The flow of acid may be controlled by any suitable device by the flow of the main stream of juice, so as to bear an invariable proportion thereto, subject to manual adjustment, control and regulation. The effect of the introduction of the acid at this point is three-fold: (1) It effects a permanent decolorization of the juice, as distinguished from the fugitive effect of sulfur dioxid or of phosphoric acid introduced before separation of the bulk of the lime precipitate. (2) It markedly increases the efficiency of the second separating tank, and the small proportion of insoluble calcium phosphate formed by reaction with the excess of lime or dissolved calcium salts facilitates to a remarkable degree the separation by gravity of the minute and light materials which have escaped sedimentation in the first separating tank. (3) It permits correction of the effects of over-liming at a point where such correction can be secured without waste of acid by double decomposition with the precipitated calcium salts.

In the accompanying drawings I have illustrated more or less diagrammatically and in side elevation a plant for the defecation and decolorizing of cane juices in accordance with my invention.

In said drawings A represents a gas-eliminator which may be of the type described in my prior application, Ser. No. 426,900, above referred to. The juice from the crushing rolls, after treatment with lime and other appropriate reagents, enters the system through pipe 1 leading to a surface condenser 2 in the upper part of the eliminator. A pipe 3 conveys the juice from this condenser to a heater or digester B by which the solution is brought to a suitable temperature which may equal or exceed the atmospheric boiling point. From this heater the juice passes to a pipe 4 and adjustably-weighted pressure-reducing valve 5 to the interior of the eliminator A, which in the form shown comprises a closed tank having cylindrical sides and a converging bottom. A pipe 6 leads from the bottom of the eliminator to a circulating pump C which delivers the degasified juice through pipes 7, 8 and 9 to a continuous-flow separating tank E, which may be of the character described in my prior Patent No. 885,450, or of any other suitable type. In the eliminator A the heated juice entering at 5 is subjected to reduced pressure, obtained for example by a pipe connection 20 leading from the upper part of the eliminator to the vacuum pump, and under such reduced pressure the escape of the contained gases is rapid and substantially complete.

D represents a re-heater for use in case it is desired to raise the temperature of the degasified juice before separating the solids therefrom.

In the separating tank E the bulk of the calcium precipitate is separated in the form of a sludge which is permitted to flow through pipe 13 to the usual mud tanks. The comparatively clear solution overflows through pipe 10 and passes by pipes 11 to the second separating tank F, receiving in its course between the tanks E and F, through pipe 15, a regulated addition of dilute phosphoric acid. In tank F the decolorization of the juice, as well as a complete separation of the residual suspended matters, is effected, and the clear juice is permitted to flow directly through pipe 12 to the evaporating system. The precipitate settling to the bottom of the tank F may be discharged continuously or intermittently through pipe 13' to the mud tanks.

14 represents a washout connection common to the tanks E and F.

From the tank F the juice preferably flows through a strainer or filter the purpose of which is to remove any fiber or like material which may have passed through the separating tanks, and flows thence direct to the evaporating system.

I claim:

1. The method of separating suspended impurities from sugar juices in continuous flow, which consists in adding lime to the juice and heating it, separating the bulk of the resulting precipitate by gravity from the flowing body of juice, adding an acid precipitant for lime to the stream of partially clarified juice, and finally separating the residual suspended matters.

2. The method of separating suspended impurities from sugar juices in continuous flow, which consists in adding lime to the juice and heating it, separating the bulk of the resulting precipitate by gravity from the flowing body of juice, adding an acid precipitant for lime to the stream of partially clarified juice, and finally separating the residual suspended matters by gravity from the flowing body of juice.

In testimony whereof, I affix my signature in presence of two witnesses.

EUGENE W. DEMING.

Witnesses:
J. RANDOLPH LONG,
TH. DENKWITZ.